(12) United States Patent
Wu et al.

(10) Patent No.: US 12,492,777 B2
(45) Date of Patent: Dec. 9, 2025

(54) THERMAL INSULATION PIPE

(71) Applicants: NATIONAL INSTITUTE FOR MATERIALS SCIENCE, Tsukuba (JP); KROSAKIHARIMA CORPORATION, Kitakyushu (JP)

(72) Inventors: Rudder Wu, Tsukuba (JP); Kuan-I Lee, Tsukuba (JP); Kazuhiro Matsuzaki, Kitakyushu (JP); Hironobu Sasayama, Kitakyushu (JP); Yukihisa Matsuo, Kitakyushu (JP); Shogo Yamashita, Kitakyushu (JP)

(73) Assignees: NATIONAL INSTITUTE FOR MATERIALS SCIENCE, Tsukuba (JP); KROSAKIHARIMA CORPORATION, Kitakyushu (JP)

( * ) Notice: Subject to any disclaimer, the term of this patent is extended or adjusted under 35 U.S.C. 154(b) by 392 days.

(21) Appl. No.: 18/028,539

(22) PCT Filed: Sep. 21, 2021

(86) PCT No.: PCT/JP2021/034448
§ 371 (c)(1),
(2) Date: Mar. 25, 2023

(87) PCT Pub. No.: WO2022/107437
PCT Pub. Date: May 27, 2022

(65) Prior Publication Data
US 2023/0358357 A1 Nov. 9, 2023

(30) Foreign Application Priority Data
Nov. 20, 2020 (JP) .................................. 2020-193779

(51) Int. Cl.
*F16L 59/02* (2006.01)
*F16L 9/18* (2006.01)
(Continued)

(52) U.S. Cl.
CPC ............... *F16L 59/028* (2013.01); *F16L 9/18* (2013.01); *F16L 59/12* (2013.01); *F16L 59/06* (2013.01); *F16L 59/14* (2013.01); *F16L 59/143* (2013.01)

(58) Field of Classification Search
CPC ......... F16L 59/00; F16L 59/02; F16L 59/028; F16L 59/04; F16L 59/06; F16L 59/12; F16L 59/14; F16L 59/143; F16L 9/18
See application file for complete search history.

(56) References Cited

U.S. PATENT DOCUMENTS

| 6,145,547 A | 11/2000 | Villatte |
| 7,562,534 B2 * | 7/2009 | Jibb ...................... F16L 59/065 62/50.7 |

(Continued)

FOREIGN PATENT DOCUMENTS

| CN | 104108720 A | 10/2014 |
| CN | 105060309 A | 11/2015 |

(Continued)

OTHER PUBLICATIONS

Office Action issued Feb. 23, 2024, in Taiwanese Patent Application No. 110136405.
(Continued)

*Primary Examiner* — Nicholas L Foster
(74) *Attorney, Agent, or Firm* — Potomac Law Group, PLLC

(57) ABSTRACT

An objective of the present invention is to provide a pipe through which fluids can flow, in which thermal insulation in a space between an inner wall and an outer wall is achieved at low cost and high performance. The thermal insulation pipe of the present invention is a thermal insulation pipe formed by a double wall pipe of an inner pipe and an outer pipe. A thermal-insulating material to be filled in a space between the inner pipe and the outer pipe is made from
(Continued)

an aerogel having a three-dimensional network structure with a framework constituted by a cluster of aggregation of primary particles. The thermal-insulating material includes fine particles having a three-dimensional network structure with a framework of the primary particles. A preferred form of such a thermal-insulating material is weakly bonded aerogel ultrafine particle generated by crushing at ultra-high speed a low-binding ultrafine aerogel generated from an aerogel with aging conditions during manufacturing process set to a low temperature and short time period.

7 Claims, 14 Drawing Sheets

(51) Int. Cl.
*F16L 59/06* (2006.01)
*F16L 59/12* (2006.01)
*F16L 59/14* (2006.01)

(56) References Cited

U.S. PATENT DOCUMENTS

| | | | |
|---|---|---|---|
| 2007/0220904 A1* | 9/2007 | Jibb | F16L 59/065 |
| | | | 62/50.7 |
| 2008/0149210 A1 | 6/2008 | Pionetti | |
| 2009/0000681 A1* | 1/2009 | Averbuch | F16L 59/14 |
| | | | 29/890.036 |
| 2016/0346751 A1 | 12/2016 | Chen et al. | |
| 2020/0191317 A1* | 6/2020 | McBride | F16L 59/08 |
| 2020/0400266 A1* | 12/2020 | Lodeho | E21B 33/13 |
| 2023/0150825 A1* | 5/2023 | Wu | C04B 30/00 |
| | | | 423/338 |
| 2023/0357525 A1* | 11/2023 | Wu | C01B 33/1585 |

FOREIGN PATENT DOCUMENTS

| | | |
|---|---|---|
| CN | 105236421 A | 1/2016 |
| CN | 208651968 U | 3/2019 |
| CN | 209819048 U | 12/2019 |
| CN | 210129711 U | 3/2020 |
| CN | 210372366 U1 | 4/2020 |
| CN | 210716325 U | 6/2020 |
| CN | 111396647 A | 7/2020 |
| CN | 111620667 A | 9/2020 |
| EP | 1857725 A2 | 11/2007 |
| JP | S51-073759 U1 | 6/1976 |
| JP | H01-230840 A | 9/1989 |
| JP | 2000-081192 A | 3/2000 |
| JP | 2005-525454 A | 8/2005 |
| JP | 2008-214568 A | 9/2008 |
| JP | 2014-035041 A | 2/2014 |
| JP | 2014-173626 A | 9/2014 |
| JP | 6288382 B2 | 3/2018 |
| JP | 2018-534219 A | 11/2018 |
| JP | 2020-060291 A | 4/2020 |
| JP | 2020-193875 A | 12/2020 |
| JP | 2022-082364 A | 6/2022 |
| KR | 10-2008-0099819 A | 11/2008 |
| KR | 10-1038949 B1 | 6/2011 |
| WO | WO 2006/133155 A2 | 12/2006 |
| WO | 2014/132655 A1 | 9/2014 |
| WO | WO 2017/038646 A1 | 3/2017 |
| WO | WO 2019/123008 A2 | 6/2019 |
| WO | WO 2022/014194 A1 | 1/2022 |
| WO | 2022/107365 A1 | 5/2022 |

OTHER PUBLICATIONS

Office Action issued Apr. 1, 2024, in Japanese Patent Application No. 2020-193779.
Office Action issued Aug. 30, 2024, in Japanese Patent Application No. 2020-193779.
Office Action issued Feb. 20, 2025, in Korean Patent Application No. 10-2023-7011863.
Extended European Search Report and European Search Opinion issued Jul. 26, 2024, in European Patent Application No. 21894312.4.
International Search Report from International Patent Application No. PCT/JP2021/034448, Dec. 7, 2021.

* cited by examiner

THERMAL INSULATION PIPE

TECHNICAL FIELD

The present invention relates to a thermal insulation pipe, and more particularly, to a thermal insulation pipe that can suitably be used for thermal insulation from environments where the temperature of a fluid passing through the thermal insulation pipe is low or high.

BACKGROUND ART

In a pipe through which fluids like liquid and gas flow, when the temperature of the fluid is low or high and the temperature difference between the fluid and the environment in which the pipe is placed is large, taking a countermeasure to absorb the temperature difference is important.

PTL 1 discloses a thermal insulation pipe which is an inner and outer double wall pipe (double wall pipe) with a vacuum area in a space between the inner pipe and the outer pipe. PTL 2 discloses a heat-insulating double casing pipe with a coating of micro-porous material around an inner pipe.

PTL 3 discloses a double wall pipe which is an inner and outer double wall pipe, including a porous and resilient compressible material in an annular space between the outer pipe and the inner pipe. It is supposed that a residual portion of a container that previously held the compressible material in a compressed state will remain in the annular space. Examples of the compressible material used are aerogel, silica aerogel, and nano-porous silica (for example, claim 6).

An aerogel used herein is a gel formed by a micro-porous solid body of which dispersed phase is gas. An aerogel is manufactured by, for example: generating a wet gel by hydrolyzing and condensing a metal alkoxide dissolved in a medium to turn the resulting sol into a gel; and then removing a solvent component from the resulting wet gel. In the wet gel, a three-dimensional network structure is established as a framework with particles contained as colloids in the sol manufactured from the metal alkoxide. Removal of the solvent component while keeping the structure leaves a structure with fine pores. By adjusting the size of the pores to be smaller than the mean free path of the air, thermal conductivity can be controlled to be low since no thermal conduction caused by gas, like convection, occur in the pores. Therefore, an aerogel is used as a thermal-insulating material.

PTL 4 discloses an aerogel complex containing an aerogel component and hollow silica particles.

CITATION LIST

Patent Document

PTL 1: Japanese Patent Application Laid-Open No. 2000-081192
PTL 2: U.S. Pat. No. 6,145,547
PTL 3: International Publication WO2006/133155
PTL 4: Japanese Patent No. 6288382

SUMMARY OF THE INVENTION

Problems to be Solved by the Invention

The present inventors studied PTLS 1, 2, 3 and 4 and found following new problems.

In the technique described in PTL 1, an exhausting apparatus is required in order to keep the space between the inner pipe and the outer pipe a vacuum. The illustrated double wall pipe is provided with an exhaust cylinder 7, which is supposed to be connected to a suction apparatus like a vacuum pump via a sealing valve (paragraph 0012). This is because complete vacuum sealing is unachievable, and the degree of vacuum decreases over time without exhausting, and it is impossible to maintain the thermal insulation effect. Such an exhausting apparatus is a cost factor.

In the technique described in PTL 2, since an outer periphery of the inner pipe is coated with a micro-porous material, the thermal insulation effect is increased and no exhausting apparatus is required. However, thermal insulation property of the micro-porous material is lower than that of the vacuum. Also, the space remaining between the inner pipe and the outer pipe impairs thermal insulation performance. When the micro-porous material deteriorates over time, maintenance such as periodic replacement is required, which is a cost factor.

In the technique disclosed in PTL 3, in order to completely fill the space between the inner pipe and the outer pipe, the material to fill the space is limited to a porous and resilient compressible material. The compressible material is sealed in a small container under reduced pressure and is filled by expansion by release from the reduced pressure after being left in the space between the inner pipe and the outer pipe (e.g., in paragraph 0014). When the porous, resilient compressible material deteriorates over time, maintenance such as periodic replacement, is required, which is a cost factor as in the technology described in PTL 2.

The aerogel composite disclosed in PTL 4 enhances thermal insulation performance and flexibility by complexing hollow silica particles. However, reduction in the bulk density cannot be expected, the bulk when used as a thermal-insulating material is a cost factor.

An objective of the present invention is to provide a thermal insulation pipe through which fluids flow, in which outer wall of the pipe is formed by an inner wall and an outer wall, with thermal insulation in the space between the inner wall and the outer wall achieved at low cost and high performance.

Means for Solving Problems

According to an embodiment, as follows.

A thermal insulation pipe including an inner pipe, an outer pipe, a space between the inner pipe and the outer pipe, and a thermal-insulating material filled in the space, in which the thermal-insulating material is made from an aerogel having a three-dimensional network structure with a framework constituted by a cluster that is an aggregation of primary particles and the thermal-insulating material includes fine particles having a three-dimensional network structure of which framework is constituted by the primary particles.

Here the primary particles will be described. In the three-dimensional network structure of the related art aerogel powder particles, the unit constituting the framework is called secondary particles (see, for example, PTL4 paragraph 0035). The primary particles are particles of smaller unit, a plurality of which aggregate to constitute secondary particles. According to PTL 4, the diameter of a secondary particle is approximately 2 nm to 50 µm while the diameter of a primary particle is 0.1 nm to 5 µm. However, the absolute values of each of the particle size of the primary particle and the particle size of the secondary particle are not defined to any uniform range as universal common general knowledge.

As used herein, aerogel fine particles having a three-dimensional network structure constituted by a framework of primary particles are referred to as weakly bonded aerogel ultrafine particle. Here, the weakly bonded aerogel ultrafine particle is formed by crushing an aerogel with a three-dimensional network structure constituted by, as a unit, particles less densely aggregated than the secondary particles that establish the framework of the three-dimensional network structure of the related art aerogels, as described later. An aerogel having a three-dimensional network structure established by, as a unit, particles that are less densely aggregated than the related art secondary particles is referred to as a low-binding ultrafine particle aerogel.

Effect of the Invention

The effect obtained by the above-described embodiment will be briefly described below.

A thermal insulation pipe which is a dual wall pipe having an inner pipe and an outer pipe, with thermal insulation in the space between the inner pipe and the outer pipe achieved at low cost and high performance can be provided. This is enabled by the reduction of the weight of the aerogel as a raw material of the thermal-insulating material to a fraction of the weight of the related art. In the present invention, the framework of the three-dimensional network structure of the aerogel, which is the raw material of the thermal-insulating material, is established by primary particles as a unit instead of the secondary particles like related arts, and the aerogel (low-binding ultrafine particle aerogel) is crushed into ultra-fine particle powder (weakly bonded aerogel ultrafine particle). This reduces bulk density of the weakly bonded aerogel ultrafine particle of the present invention to a fraction of the bulk density of the related art aerogel powders. Then the weight of the aerogel required to fill the space between the inner pipe and the outer pipe can be reduced to a fraction of that of the related art. The term "bulk density" used herein is the apparent density of the powder, and is calculated by dividing the mass of the powder when filled with the powder in a container of known volume by the volume of the container. For the volume of the container, not only the total volume of the particles constituting the powder but also the gap between the particles is included in the volume, so bulk density is also dependent on the gap of the particles constituting the powder.

DETAILED DESCRIPTION OF THE INVENTION

1. Summary of Embodiment

Figure 1:
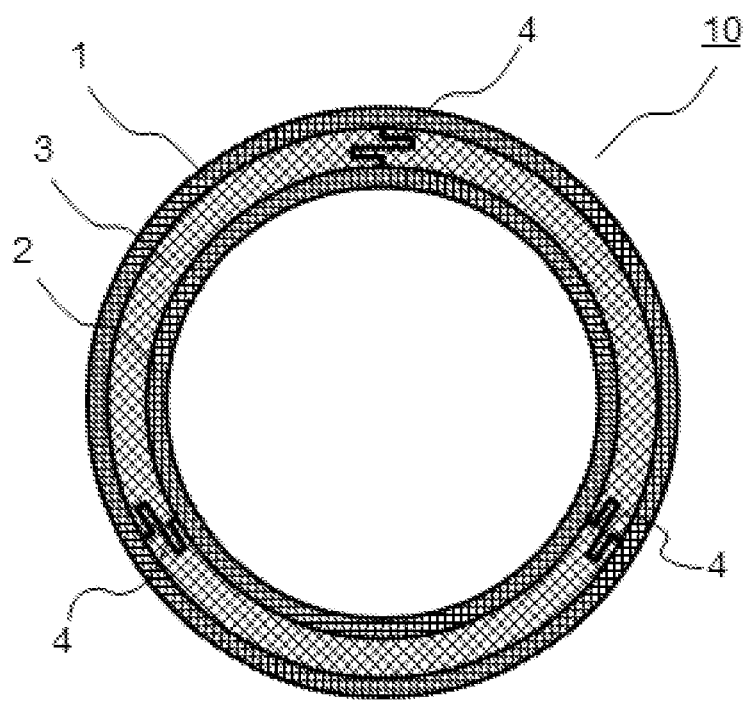
FIG. 1 is an explanatory diagram illustrating a cross-sectional structure of a thermal insulation pipe according to the present invention.

First, a summary of a typical embodiments disclosed in the present application will be given. Reference numerals in the drawings referred to in parentheses in the summary description of the typical embodiments are merely illustrative of what are included in the concepts of the components to which they are attached.

[1] Double thermal insulation pipe filled with weakly bonded aerogel ultrafine particle (FIGS. 1, 2, 6, 7, 9)

A thermal insulation pipe (10) including an inner pipe (2), an outer pipe (1), a space between the inner pipe and the outer pipe, and a thermal-insulating material (3) filled in the space, in which the thermal-insulating material is made from an aerogel (31) having a three-dimensional network structure with a framework constituted by a cluster (21) that is an aggregation of primary particles (11) and the thermal-insulating material includes fine particles (51) having a three-dimensional network structure of which framework is constituted by the primary particles. Note that the fine particles (51) having a three-dimensional network structure constituted by a framework of primary particles are weakly bonded aerogel ultrafine particles and the raw material, the aerogel (31), is a low-binding ultrafine particle aerogel.

In this manner, a thermal insulation pipe which is a dual wall pipe having an inner pipe and an outer pipe, with thermal insulation in the space between the inner pipe and the outer pipe achieved at low cost and high performance can be provided.

Figure 12:
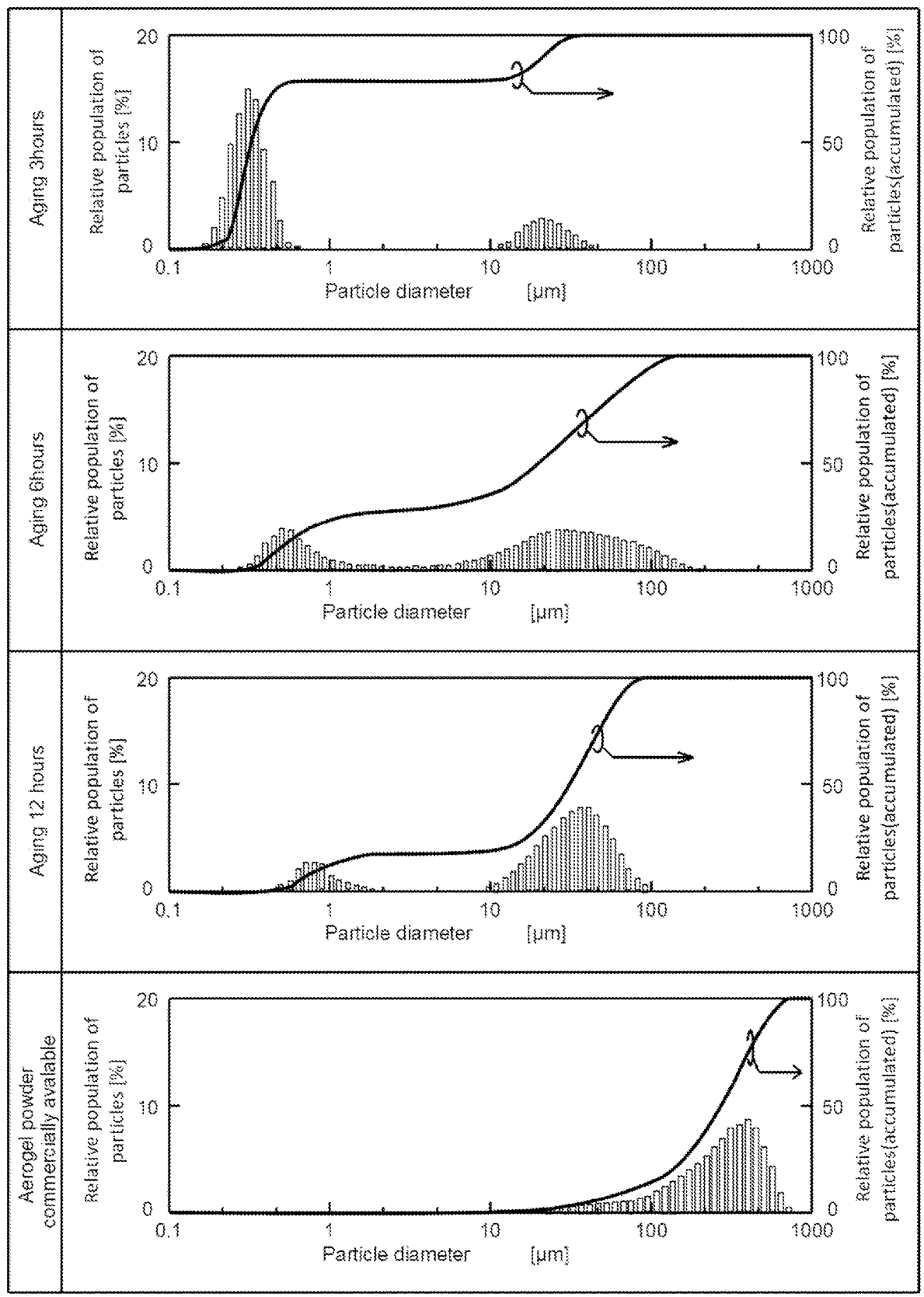
FIG. 12 is a distribution diagram illustrating particle size distribution after the high-speed crushing process.

[2] More than half of weakly bonded aerogel ultrafine particle have dispersion peak in 1 gm or less of particle size (FIG. 12)

In the thermal insulation pipe of [1], 50% or more of the total number of the fine particles is dispersed with a mode value of the particle size in 0.1 μm or more and 1.0 μm or less. Note that the particle size used herein is the value observed using a laser diffraction type particle size distribution measurement device. Laser diffraction particle size distribution measurement is abbreviated as PSD (particle size distribution) measurement in this specification. Particle size will be explained herein under PSD measurement. However, in the PSD measurement, not only the diameter of the particles themselves but also aggregation of the particles are observed as the particle size, so the true particle size is likely to be smaller than the measured value. If there is a difference in particle size depending on the measurement method, conversion should be applied.

In this manner, bulk density of the weakly bonded aerogel ultrafine particle of the present invention is reduced to a fraction of the bulk density of the related art aerogel powders. Fine particles having a dispersion peak in 1 μm or less of the particle size are considered to be fine particles (51) with a three-dimensional network structure established by a framework of primary particles. Even if the dispersion peak is not sufficiently large, a certain effect of reducing bulk density can be expected. When such fine particles occupy a large part of the particles, however, the effect becomes significant.

[3] Addition of hollow particles (Second Embodiment)

In the thermal insulation pipe of [1] or [2], the thermal-insulating material further includes hollow particles.

This can lower thermal conductivity of the thermal-insulating material.

[4] Enclosure of special gas in hollow particles (Second Embodiment)

In the thermal insulation pipe of [3], the hollow particle has a shell, and gas of thermal conductivity lower than that of air is enclosed in a hollow portion inside the shell.

This can further lower thermal conductivity of the thermal-insulating material.

[5] Enclosure of special gas in space between inner pipe and outer pipe (Third Embodiment)

In the thermal insulation pipe according to any one of [1] to [4], gas of thermal conductivity lower than that of air is enclosed in the space between the inner pipe and the outer pipe.

This can further enhance thermal insulation performance of the thermal-insulating material.

[6] Reduce pressure in space between inner pipe and outer pipe (Third Embodiment)

In the thermal insulation pipe according to any one of [1] to [4], pressure in the space between the inner pipe and the outer pipe is reduced lower than the atmospheric pressure.

This can further enhance thermal insulation performance of the thermal-insulating material.

[7] Support mechanism of double wall pipe (Third Embodiment)

The thermal insulation pipe according to any one of [1] to [4] includes a support mechanism fixed to the outer pipe for supporting the inner pipe, and the support mechanism is formed by folding a member that is longer than the linear distance between the inner pipe and the outer pipe.

This can reduce thermal conduction through the support mechanism connecting the inner pipe and the outer pipe, improving the thermal insulation performance of the entire thermal insulation pipe.

[8] Reinforcement of inner pipe (Third Embodiment)

In the thermal insulation pipe according to any one of [1] to [7], the inner pipe is further wrapped with a member containing fiber.

This can prevent any accident such as a rupture of the inner pipe, even when high-pressure gas or liquid is to flow through the thermal insulation pipe.

2. Details of the Embodiments

Details of the embodiments will be described in more detail.

First Embodiment

Figure 2:
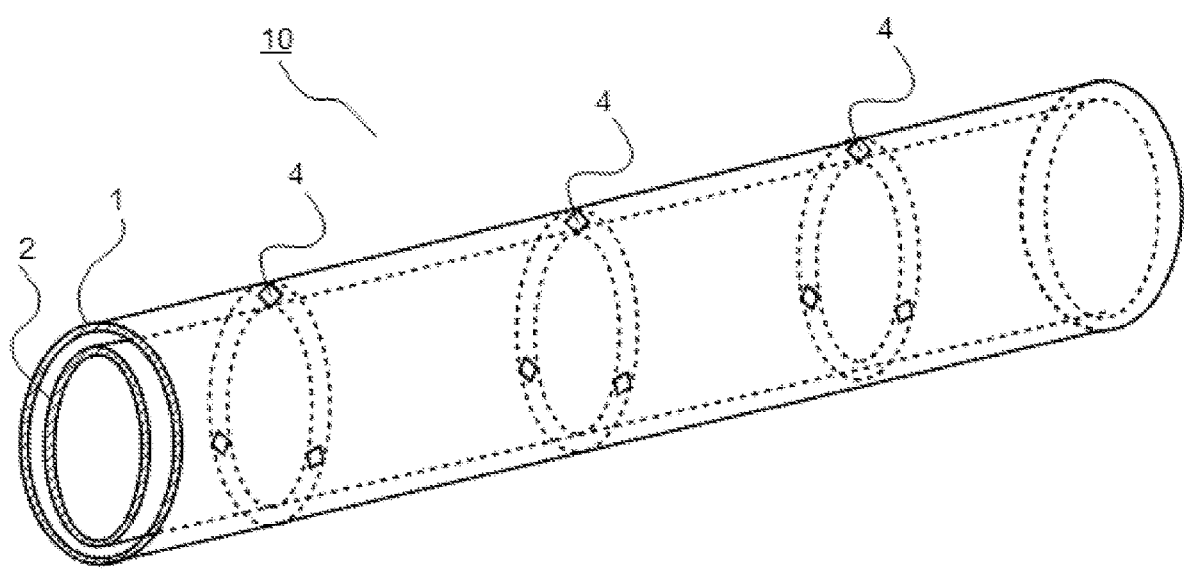
FIG. 2 is an explanatory diagram illustrating the structure of the thermal insulation pipe according to the present invention shown in a bird's-eye view.

FIG. 1 is an explanatory diagram illustrating a cross-sectional structure of a thermal insulation pipe according to a first embodiment, and FIG. 2 is an explanatory diagram illustrating the structure of the thermal insulation pipe shown in a bird's eye view.

A thermal insulation pipe 10 according to the first embodiment is a thermal insulation pipe including an inner pipe 2 and an outer pipe 1. The inner pipe 2 is supported by a support member 4 which is attached to an inner wall surface of the outer pipe 1, and an annular space is formed between the inner pipe 2 and the outer pipe 1. The annular space is filled with a thermal-insulating material 3. As illustrated in FIGS. 1 and 2, three support members 4 are used, for example, to support the outer periphery of the inner pipe 2 at three places, and a set of three support members 4 is arranged at appropriate intervals along the longitudinal direction of the thermal insulation pipe 10.

The thermal-insulating material to fill the annular space between the inner pipe 2 and the outer pipe 1 includes weakly bonded aerogel ultrafine particle. Here, the weakly bonded aerogel ultrafine particle is fine particles made from an aerogel having a three-dimensional network structure with a framework constituted by a cluster that is an aggregation of primary particles and having a three-dimensional network structure with a framework of the primary particles. This achieves a thermal-insulating material to fill the annular space between the inner pipe 2 and the outer pipe 1 at low cost and high performance. Here, the fine particles preferably have a mode value (peak) of the particle size at 1.0 μm or less, more preferably 50% or more of the total number thereof have a dispersion peak in 0.1 μm or more and 1.0 μm or less. This can reduce the bulk density of the aerogel powder to a fraction of the bulk density of the related art aerogel powder. Then the weight of the aerogel required to fill the space between the inner pipe and the outer pipe can be reduced to a fraction of that of the related art.

Generally, it is well known that an aerogel having a three-dimensional network structure with fine pores can be manufactured by, for example, supercritical drying of a gel made by a sol-gel method. An aerogel is manufactured by: generating a wet gel by hydrolyzing and condensing a metal alkoxide solution to turn the resulting sol into a gel; aging the obtained wet gel; and then removing the solvent component by a supercritical drying method. In the metal alkoxide solution, the primary particles are in a solvent state, and the primary particles condense with each other by hydrolysis and condensation to form a colloid. The resulting colloid is a gel, which is called the secondary particles in contrast to the primary particle before condensation. In a gelled state, the colloid is a wet gel containing the solvent component. When the solvent component is removed from the wet gel by a supercritical drying method, etc., a three-dimensional network structure established by secondary particles as a unit remains. This is an aerogel. Such an aerogel is mechanically crushed and used as a powder of the size of tens of pm to several millimeters.

The weakly bonded aerogel ultrafine particle of the present invention is manufactured by forming a low-binding ultrafine particle aerogel with reduced progression of aging compared with the related art, and crushing it at an ultra-high speed. This results in the particles about 1000 times finer than those of the related art aerogel when mechanically crushed. More specifically, the weakly bonded aerogel ultrafine particles are desirably prepared by crushing at an ultra-high speed, under aging conditions and crushing conditions in which when observed by PSD measurement, the particle size may preferably have a mode value (peak) of dispersion at 1.0 μm or less, and more preferably 50% or more of the total number of the weakly bonded aerogel ultrafine particle have a mode value of particle size in 100 nm or more and 1.0 μm or less. The particle size of the weakly bonded aerogel ultrafine particle observed by the present inventors by PSD measurement is distributed with a mode value of about 300 nm. Details will be described later.

Each particle of the weakly bonded aerogel ultrafine particle of the present invention has a three-dimensional network structure. While related art aerogel powder particles have a three-dimensional network structure, the particle of the weakly bonded aerogel ultrafine particle of the present invention is different in unit constituting the framework. That is, as described in paragraph 0035 of PTL 4 that "an aerogel particle 1 is considered to be in the form of a secondary particle constituted by a plurality of primary particles", the related art three-dimensional network structure of aerogel powder particles is constituted by secondary particles as a unit. In contrast, the particle of the weakly bonded aerogel ultrafine particle of the present invention is characterized in that the unit constituting the framework thereof is primary particles.

Figure 3:
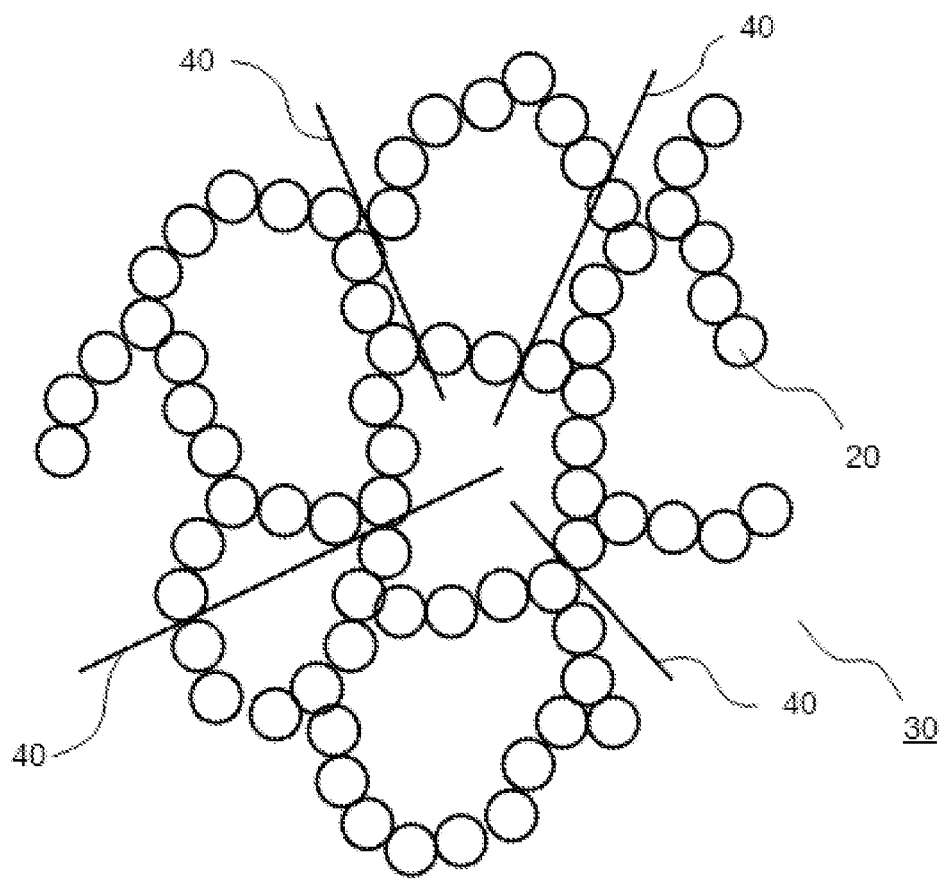
FIG. 3 is an explanatory diagram schematically illustrating a general aerogel structure and cut surfaces when the general aerogel is to be crushed.
Figure 4:
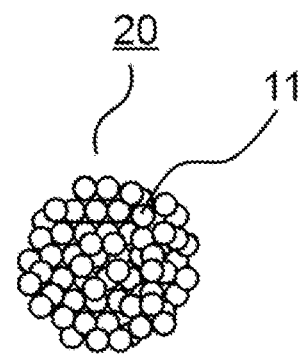
FIG. 4 is an explanatory diagram schematically illustrating a secondary particle constituting a framework of a three-dimensional network structure of a general aerogel.
Figure 5:
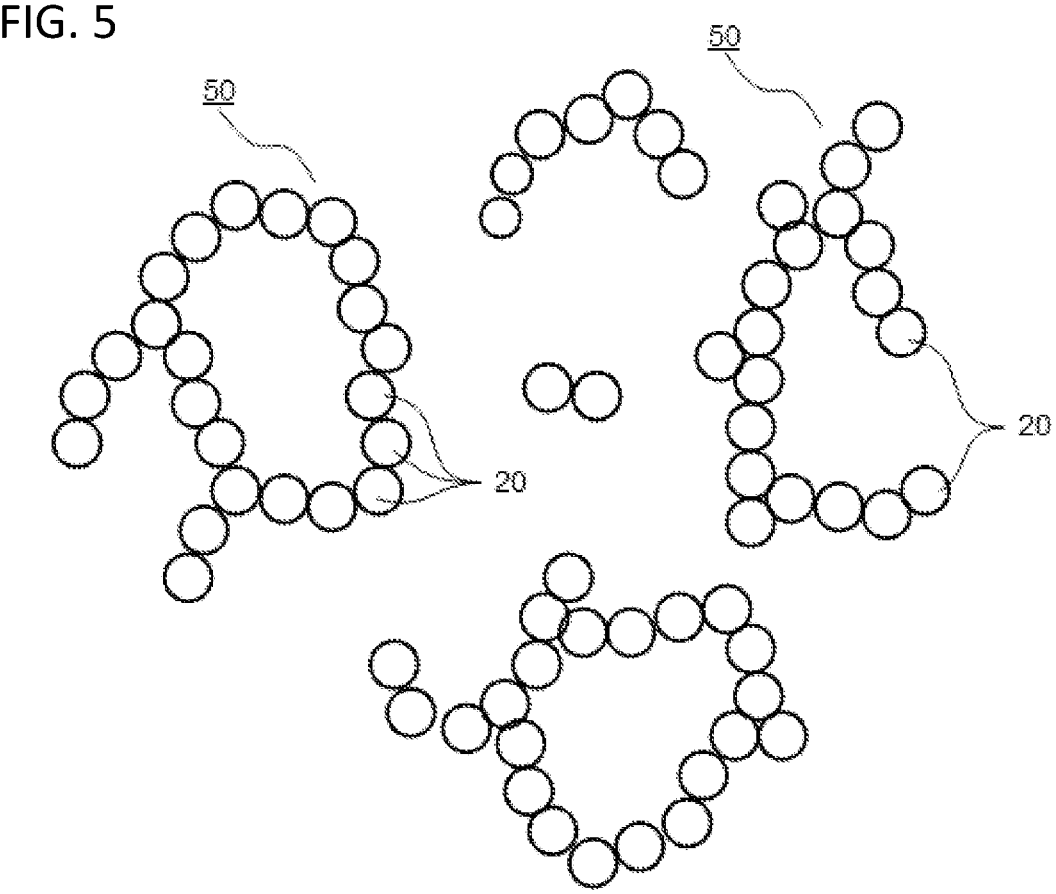
FIG. 5 is an explanatory diagram schematically illustrating aerogel powder manufactured by crushing a general aerogel.

FIGS. 3 to 5 are explanatory diagrams schematically illustrating a general aerogel and a structure of aerogel powder formed by crushing the general aerogel. FIG. 3 schematically illustrates a structure of a general aerogel 30 and cut surfaces 40 when the general aerogel 30 is to be crushed. FIG. 4 schematically illustrates secondary particles 20 constituting the framework of the three-dimensional network structure. FIG. 5 schematically illustrates aerogel powder 50 manufactured by crushing the aerogel 30 of FIG. 3. As illustrated in FIG. 3, in the general aerogel 30, a colloid contained in the gel before drying becomes the secondary particles 20 and forms a three-dimensional network structure with the secondary particle 20 as a unit of the framework. In the thus manufactured aerogel 30, the framework occupies about 10% of the volume of the three-dimensional network structure, and rest of the volume, about 90% is occupied by pores. When the size of the pore is smaller than the mean free path of the gas filling the pores such as air, thermal conduction due to the collision of gas molecules hardly occurs. Therefore, an aerogel is used as a thermal-insulating material.

FIG. 5 schematically illustrates the structure of aerogel powder 50 when a general aerogel is crushed. When the general aerogel 30 illustrated in FIG. 3 is crushed, cut surfaces 40 to be cut by the crusher are in not the secondary particles 20 but areas where the secondary particles are connected. This is considered to be because the secondary particles 20 are strongly bonded as the primary particles 11 are densely aggregated as illustrated in FIG. 4, and the bond between the secondary particles is much weaker. The result is that the aerogel powder 50 obtained by crushing the general aerogel 30 has a three-dimensional network structure of which framework is constituted by the secondary particles 20 (FIG. 5).

Figure 6:
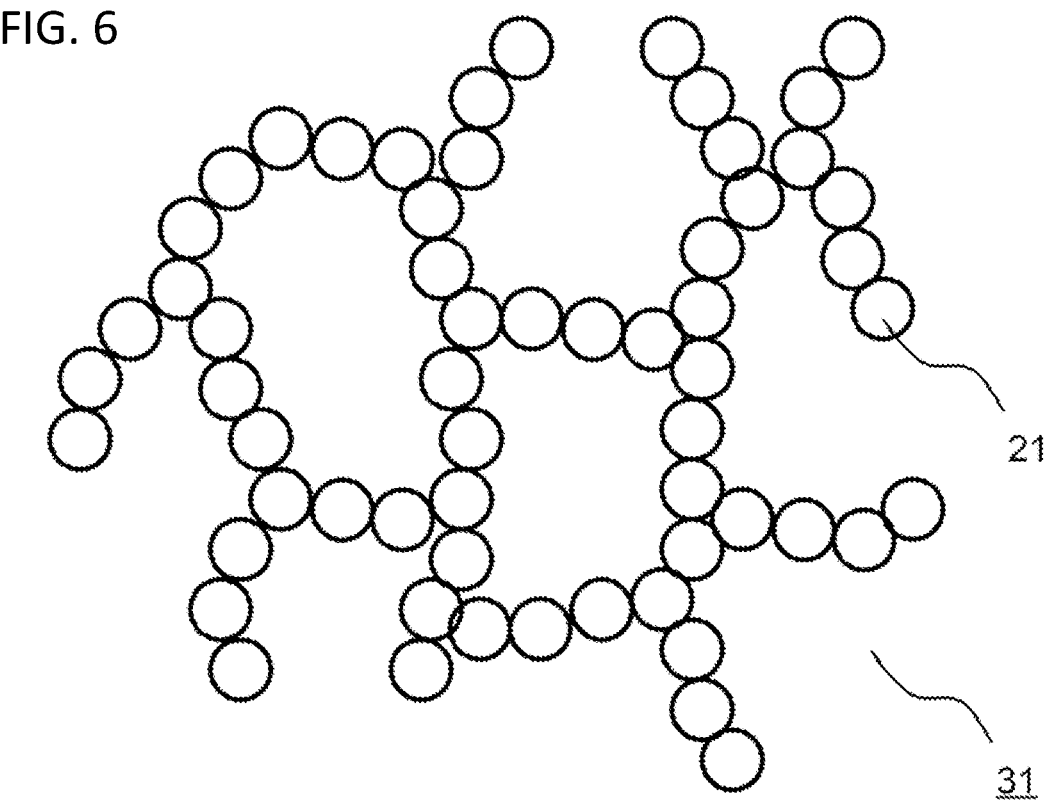
FIG. 6 is an explanatory diagram schematically illustrating a three-dimensional network structure of a low-binding ultrafine particle aerogel formed after an aging process in a process of manufacturing the weakly bonded aerogel ultrafine particle of the present invention.
Figure 7:
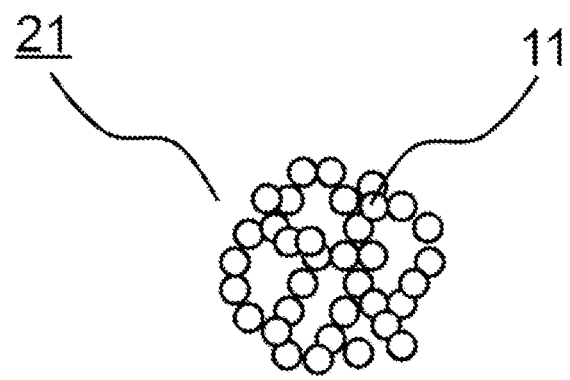
FIG. 7 is an explanatory diagram schematically illustrating a secondary particle constituting a framework of a three-dimensional network structure of the low-binding ultrafine particle aerogel illustrated in FIG. 6.
Figure 8:
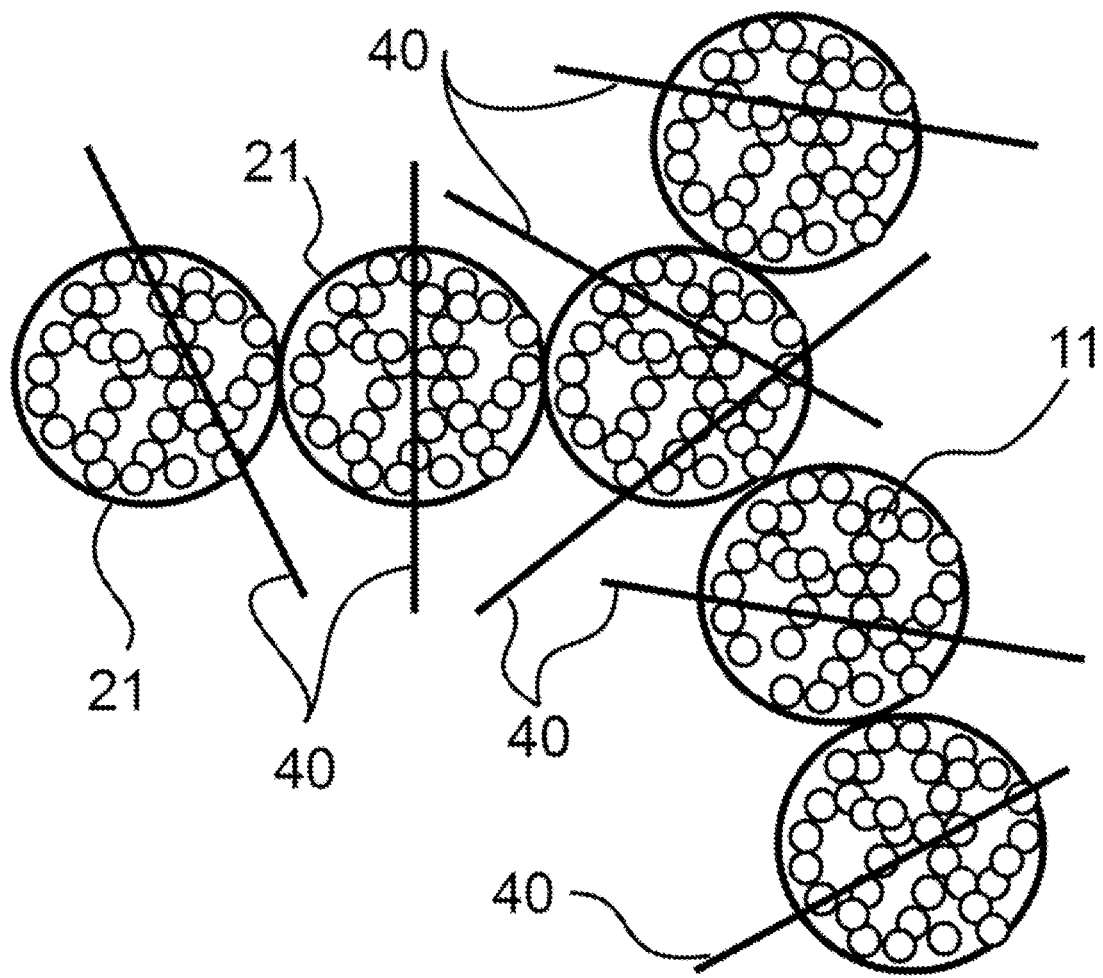
FIG. 8 is an explanatory diagram schematically illustrating cut surfaces when the low-binding ultrafine particle aerogels illustrated in FIG. 6 are to be crushed.
Figure 9:
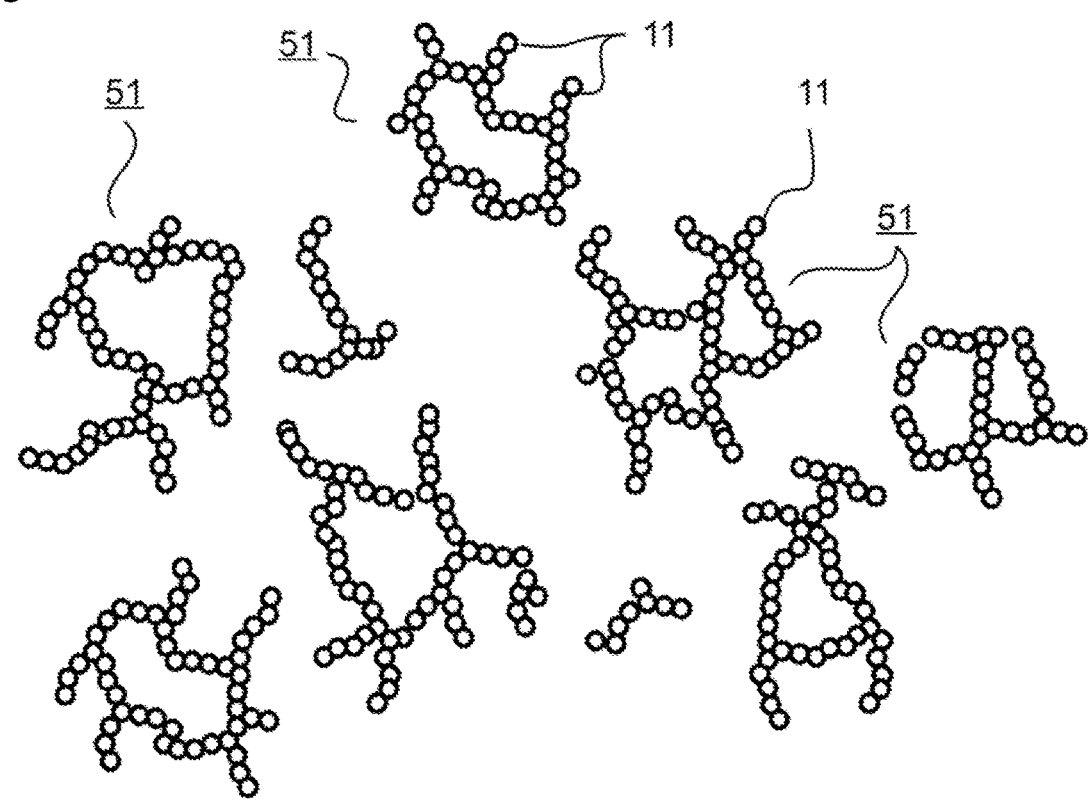
FIG. 9 is an explanatory diagram schematically illustrating the weakly bonded aerogel ultrafine particle of the present invention.

FIGS. 6-9 are explanatory diagrams schematically illustrating a structure of the aerogel 31 of the present invention after aging and the weakly bonded aerogel ultrafine particle 51 manufactured by crushing the aerogel 31. FIG. 6 schematically illustrates the three-dimensional network structure of the low-binding ultrafine particle aerogel 31 formed after the aging process in the process of manufacturing the weakly bonded aerogel ultrafine particle 51 of the present invention. FIG. 7 schematically illustrates a secondary particle 21 constituting a framework of the three-dimensional network structure of the low-binding ultrafine particle aerogel illustrated in FIG. 6. FIG. 8 schematically illustrates cut surfaces 40 when the low-binding ultrafine particle aerogel 31 illustrated in FIG. 6 are to be crushed. FIG. 9 schematically illustrates the weakly bonded aerogel ultrafine particle 51 of the present invention. In the present invention, the low-binding ultrafine particle aerogel 31 is manufactured with reduced progression of aging compared with general processes. Therefore, the three-dimensional network structure of the thus obtained low-binding ultrafine particle aerogel 31 will be established with, as a framework, the secondary particles 21 (FIG. 7) in which primary particles 11 are less densely aggregated than in the related art (FIG. 6). When the low-binding ultrafine particle aerogel 31 with such a three-dimensional network structure (FIG. 6) is crushed at an ultra-high speed, it is considered that the cut surfaces 40 by the crusher exist not only at the bonding portion of the secondary particles 21 constituting the framework but also at the secondary particles 21 itself as illustrated in FIG. 8 so that the secondary particles 21 themselves are crushed. As a result, the weakly bonded aerogel ultrafine particle 51 of the present invention has a three-dimensional network structure in which the framework is formed by the primary particles 11 as illustrated in FIG. 9. Although an outer edge of the actual secondary particle 21 is unclear since the secondary particle 21 is constituted by the less densely aggregated primary particles 11 as illustrated in FIG. 7, the portion corresponding to the outer edge of the secondary particle 21 is depicted by a circle of solid line in FIG. 8.

The present inventors have noticed that a colloid formed in the manufacturing process of an aerogel is formed by hydrolysis and condensation, and that an aerogel having a three-dimensional network structure forming a framework with primary particles as a unit can be manufactured by adjusting the aging conditions controlling the condensation reaction. Then they achieved the present invention. Hereinafter, an example of the manufacturing method will be described.

Figure 10:
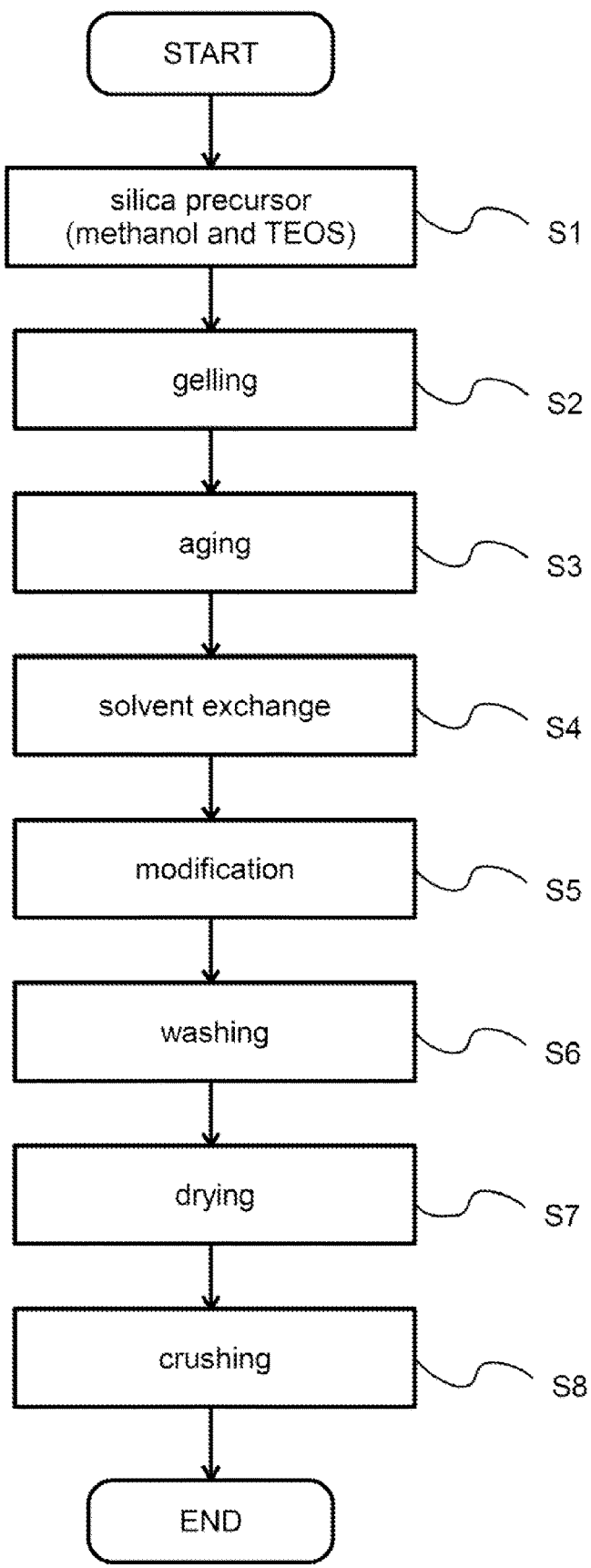
FIG. 10 is a flowchart illustrating an example of a method for manufacturing the weakly bonded aerogel ultrafine particle of the present invention.

FIG. 10 is a flowchart illustrating an example of a method for manufacturing weakly bonded aerogel ultrafine particle of the present invention.

Silica aerogel is manufactured mainly in the following two steps: a step of forming a wet gel in the sol-gel method; and a step of drying the wet gel. The wet gel consists of a network of nanostructured solid silica and a liquid solvent, and is manufactured by hydrolysis and condensation of silica precursor molecules. This silica precursor is manufactured by mixing TEOS (tetraethoxysilane) with methanol (S1). Then a total of 6.3 g of oxalic acid (0.01 M) is added to the mixture, and finally 1.5 g of ammonium hydroxide ($NH_4OH$ 0.5 M) is added to obtain an alkosol. The alkosol becomes a gel when left at room temperature (S2).

Following gelling, the alkogel was aged in methanol at 60° C. for 3 hours, 6 hours and 12 hours, respectively (S3). An excess amount of methanol was added to the gel and then vaporized in a drying process in a raised temperature higher than the room temperature. The alkogel was immersed in hexane at 60° C. for 10 hours to avoid a reverse reaction of surface modification, and the hexane-only solvent was replaced with a mixture of hexane and TMCS (trimethylchlorosilane) to modify the surface (S4). The volume ratio of hexane to TMCS was kept at a constant value of 4. In the surface modifying step (S5), the alkogel was immersed in a mixture of hexane and TMCS at 60° C. for 24 hours. Before drying the alkogel, the sample was immersed in pure hexane at 60° C. for 6 hours to remove excess TMCS (S6). The final step in manufacturing an aerogel is drying (S7). The drying process consists of the first to third steps and a cooling step. After being kept 4 hours at 40° C. in the first step, 2 hours at 80° C. in the second step, and 1 hour at 120° C. in the third step, the aerogel was cooled with the entire heating furnace.

Figure 11:
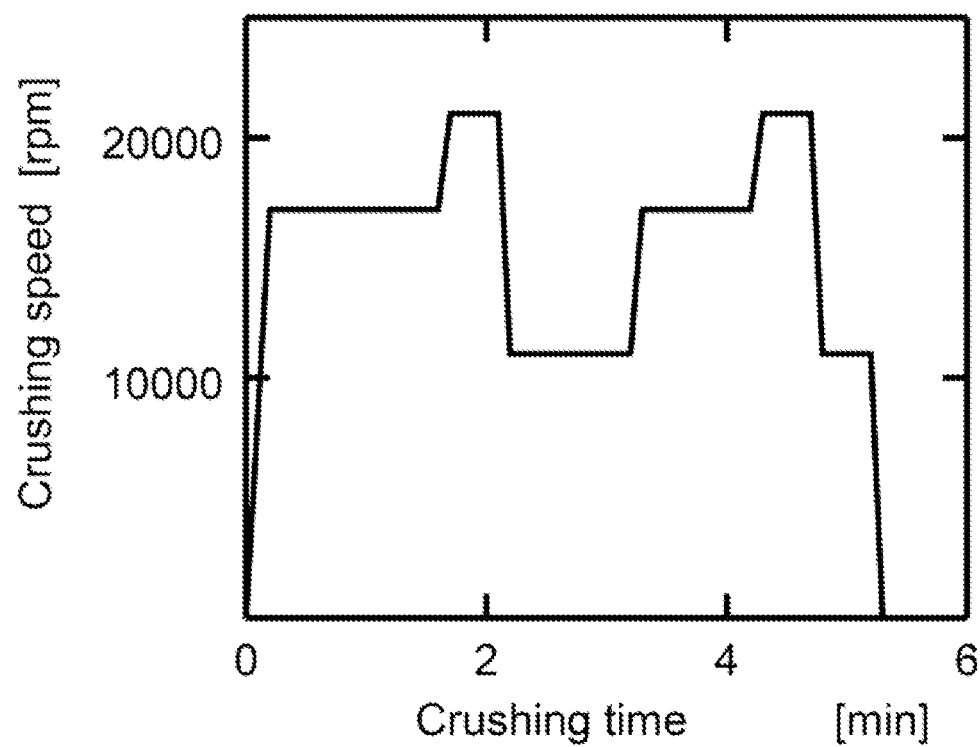
FIG. 11 is an explanatory diagram illustrating a control example of a rotational speed of a crusher in a high-speed crushing process.

After the drying step (S4 to S7), the aerogel sample was subjected to a high-speed crushing process (S8). A crushing program of about 5 minutes at a high speed of 11,200 rpm to 21,000 rpm was conducted three times using Wonder Crusher WC-3 from Osaka Chemical Co., Ltd. as illustrated in FIG. 11.

FIG. 12 is a distribution diagram illustrating particle size distribution after the high-speed crushing process. For each sample of an aging time of 3 hours, 6 hours, and 12 hours, the particle size after the high-speed crushing process is plotted on the horizontal axis in the log scale, and the frequency of the relative particle amount (the left vertical axis) and the cumulative value of the relative particle amount (the right vertical axis) are shown. Data from the related art (commercially available) aerogel powder is given for comparison. Here, the particle size is observed by PSD measurement. More specifically, FIG. 12 shows the results of measurement using Laser Diffraction Particle Size Analyzer SALD-2300 from Shimadzu Corporation. It should be noted that not only the diameter of the particles themselves but also the aggregation of the particles is observed as the particle size in the PSD measurement, so the measurement values are biased positively (i.e., errors often occur in which values larger than true values are measured). However, information enough to explain the characteristics of the weakly bonded aerogel ultrafine particle of the present invention has been obtained as described below.

In the related art aerogel powder, the relative particle amount has a single peak with the mean particle size being about 300 μm. In contrast, in the weakly bonded aerogel ultrafine particle of the present invention, each of the samples aged 3 hours, 6 hours, and 12 hours, the frequency of the relative particle amount after the high-speed crushing process has two peaks. In the sample aged 3 hours, the first peak is an average of 0.32 μm, a standard deviation of 0.10, and a second peak is an average of 21.14 μm, a standard deviation of 0.14; in the sample aged 6 hours, the first peak is an average of 0.66 μm, a standard deviation of 0.15, and a second peak is an average of 31.89 μm, a standard deviation of 0.40; and in the sample aged 12 hours, the first peak is an average of 0.96 μm, a standard deviation of 0.13, and a second peak is an average of 38.52 μm, a standard deviation of 0.21.

Having two peaks strongly suggests that there is an intrinsic difference in the particles making up each peak. This is because if there is no intrinsic change in the particles and only the size of the particles manufactured under the aging conditions changes, two peaks would unlikely appear even if the position of the peak changes with the particle size. Therefore, it is natural to consider that particles of larger particle size constituting the second peak have a three-dimensional network structure whose framework unit is the secondary particle as in the related art, while particles of smaller particle size constituting the first peak have a three-dimensional network structure whose framework unit is the primary particles. This result supports the above explanation with reference to FIGS. 3 to 5 and 6 to 9.

Further, it is found that by changing the aging conditions, the properties of the particles generated after high-speed crushing can be significantly changed, i.e. controlled. The properties of the particles here may be whether the secondary particle is the constituent unit of the framework or the primary particle is the constituent unit of the framework. The mode value of the dispersion of the larger particle size is 10 μm or more, and the mode value of the dispersion of the smaller particle size is 1 μm or less. In the samples aged 6 hours and 12 hours followed by high-speed crushing, the sample whose cumulative value of the relative particle amount exceeds 50% is on the side of the peak of the larger particle size. In the sample aged 6 hours followed by high-speed crushing, the cumulative value of the relative particle amount exceeds 50% when the particle size is about 20 μm. In the sample aged 12 hours followed by high-speed crushing, the cumulative value of the relative particle amount exceeds 50% when the particle size is about 40 μm. Both of them are on the second peak side. In the sample aged 3 hours followed by high-speed crushing, the cumulative value of the relative particle amount exceeds 50% when the particle size is about 0.3 μm and the particle size is on the smaller peak (first peak) side. From another point of view, it is found that in the sample aged 6 hours and 12 hours followed by high-speed crushing, 60% to 70% of the particles are particles with a diameter of 10 μm or more, and are therefore mainly particles having a secondary particle as a constituent unit of the framework from their size. In contrast, in the sample of the weakly bonded aerogel ultrafine particle of the present invention aged 3 hours, it is shown that about 80% of the particles have a diameter in the range of 0.1 μm and 1.0 μm, and therefore mainly are particles having a primary particle as a constituent unit of the framework from their size.

Note that regarding the aging condition, besides shortening the time as described above from the time of the related art, it is also effective to lower the temperature than the related art. That is, the aging conditions for manufacturing the weakly bonded aerogel ultrafine particle of the present invention are as follows: the temperature is 15° C. to 70° C., more preferably 20° C. to 70° C., even more preferably 25° C. to 60° C., and time is 0 to 24 hours, more preferably 0 to 12 hours, and even more preferably 3 to 12 hours. The crushing parameters are as follows: the rotational speed is 10,000 to 30,000 rpm, more preferably 10,000 to 25,000 rpm, and even more preferably 11,000 to 22,000 rpm, and time is from 1 to 120 minutes, more preferably from 3 to 60 minutes, and even more preferably from 5 to 45 minutes.

The bulk density of the prototype weakly bonded aerogel ultrafine particle was measured to be 0.018 g/cm3. This is one third to one eleventh of the bulk density of 0.06 g/cm3 to 0.20 g/cm3 of commercially available aerogel powders. The thermal conductivity was measured to be 23 mW/m·K, which is equivalent to the thermal conductivity of about 23 mW/m·K of commercially available aerogel powders.

Figure 13:
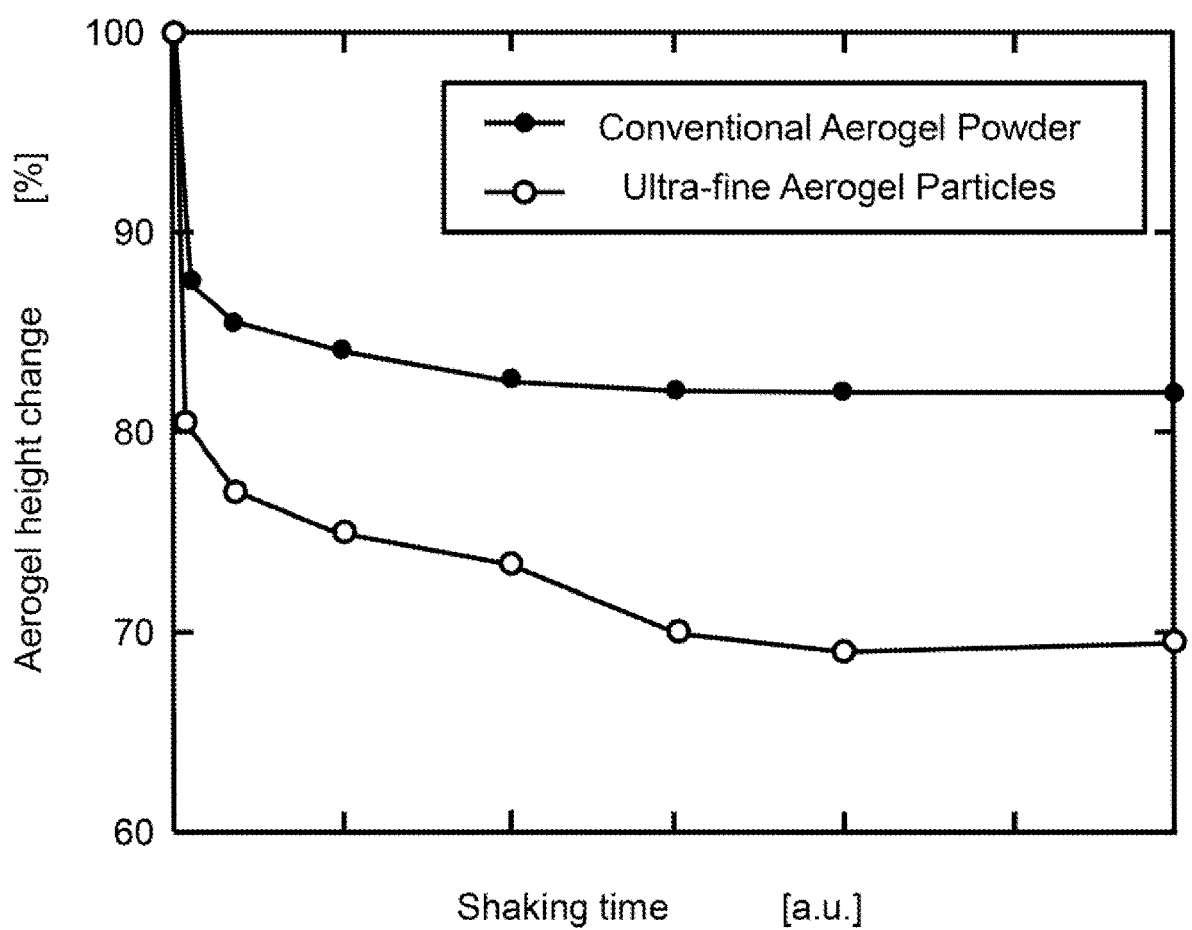
FIG. 13 is a graph showing compression characteristics when shaking is applied to a prototype weakly bonded aerogel ultrafine particle.

FIG. 13 is a graph showing compression characteristics when shaking is applied to the prototype weakly bonded aerogel ultrafine particle. The graph shows the measurement result of the change of the height of the aerogel over time when the prototype weakly bonded aerogel ultrafine particle is placed in a container with a fixed bottom area and shook. The result is shown in comparison with that of a commercially available aerogel powder. The shaking time is plotted on the horizontal axis is in an arbitrary unit. While the related art aerogel powder reached a constant value at 82% of the initial height, the prototype weakly bonded aerogel ultrafine particles reached a constant value at 69%. Using this property, the saturation point where the bulk density is compressed by aging can be estimated as follows: the bulk density 0.018 g/cm3 of the above-described prototype weakly bonded aerogel ultrafine particle will reach up to 0.026 g/cm3 due to shaking. According to a similar idea, the bulk density of the commercially available aerogel powders, about 0.12 g/cm3, reaches up to 0.13 g/cm3. Although the difference becomes smaller slightly, the ratio is still 1:5. The bulk density of the weakly bonded aerogel ultrafine particle of the present invention is a fraction of the bulk density of the related art aerogel powders, and the amount required to fill the same space is reduced to a fraction of that of the related art aerogel powders.

As described above, when the weakly bonded aerogel ultrafine particle of the present invention is used as a thermal-insulating material for filling an annular space between an inner pipe and an outer pipe of a double wall pipe, the cost of the thermal-insulating material required for filling can be reduced significantly since the bulk density is a fraction of that of the related art aerogel powder. Since the weakly bonded aerogel ultrafine particle is hydrophobic, aging deterioration due to reaction between the aerogel and the water remaining in the annular space hardly occurs, the maintenance cost for, for example, periodically replacing the thermal-insulating material is also greatly reduced. Furthermore, since the weakly bonded aerogel ultrafine particle is very fine, it can be filled thoroughly even if there is a narrowed portion in the annular space between the inner pipe and the outer pipe, which greatly contributes to enhancing thermal insulation performance as a thermal insulation pipe.

Second Embodiment

In the thermal insulation pipe 10 of the first embodiment, the hollow particles may be further added to the weakly bonded aerogel ultrafine particle which is filled as a thermal-insulating material in the annular space between the inner pipe 2 and the outer pipe 1. This can lower thermal conductivity of the thermal-insulating material.

When an aerogel is used as a thermal-insulating material, since the size of the pore in the aerogel is smaller than the mean free path of air, thermal conduction caused by collision of gas molecules or convection of gas is suppressed, and thermal insulation performance close to the case where the pore is a vacuum is expected. In reality, however, the performance of a vacuum is not attained. The present inventors studied the cause and found that the thermal-insulating material filled with aerogel powder has fine communication holes left, through which thermal conduction as described above is caused. Therefore, the present inventors have created a technique to lower thermal conductivity by adding hollow particles to the aerogel and hybridize the same (filed as Japanese Patent Application No. 2020-120921). Since the added hollow particles block the above-described fine communication holes, suppressing thermal conduction caused slightly by gas, it is possible to lower thermal conductivity.

Since the spherical shell constituting the hollow particle is highly airtight, by enclosing gas of lower thermal conductivity than air in the spherical shell, it is possible to further lower thermal conductivity of the thermal-insulating material.

Although not particularly limited, the hollow particles to be added may be nano-size hollow particles, micro-size hollow particles, or both of them. The nano-size hollow particles are preferably prepared in the range of an outer diameter of 30 nm to 360 nm and a spherical shell thickness of 7.5 nm to 65 nm. The outer diameter corresponds to a range of about half to about 5 times the mean free path of air at room temperature and pressure. As described above, since the hollow size is adjusted to the same order as the mean free path of air, the nano-size hollow particles contributes largely to the thermal insulation effect when added to an aerogel. The micro-size hollow particles are preferably prepared in the range of 1 μm to 23 μm in outer diameter and 0.35 μm to 3 μm in spherical shell thickness. The outer diameter is 15 times larger than the mean free path of air at room temperature and pressure, having an effect of increasing the structural strength of the network while contributing to the thermal insulation effect. Although fine communication holes remains in the aerogel as described above, the added hollow particles block the communication holes and suppress thermal conduction through gas such as convection generated through the communication holes. This increases the thermal insulation effect.

Nano-size hollow particles can be manufactured by a soft-template method, for example. A surface of a polymer electrolyte is modified with ammonia in ethanol and coated with silica ($SiO_2$) to generate particles consisting of a core and a spherical shell. The particles are washed or sintered to remove a medium enclosed in the core to generate a hollow particle.

Micro-size hollow particles are desirably manufactured by a double emulsion method, for example. From a dispersive multiphase system consisting of an immiscible liquid of an oil phase containing a surfactant and an aqueous phase containing a precursor and a surfactant, the oil phase is emulsified into a continuous phase, an emulsion containing droplets centered on the aqueous phase is formed, and an aqueous phase is added thereto to obtain an emulsion which has an aqueous continuous phase and contains droplets centered on a gel. Micro-size hollow particles are manufactured by washing/filtering or sintering the particles.

In the method for manufacturing the weakly bonded aerogel ultrafine particle of the present invention, the hollow particles may be added to a mixture of TEOS and methanol prepared as a silica precursor (S1) prior to the gelling process (S2) in the flowchart illustrated in FIG. 10. After the addition of the hollow particles, the mixture may be stirred thoroughly by ultrasonic vibrating so that added hollow particles are dispersed uniformly. The amount of hollow particles to add is adjusted, for example, to achieve the following composition relative to the entire hybridized aerogel.

The nano-size hollow particles are preferably from 0.01% to 30% by weight, more preferably from 0.10% to 15% by weight, and most preferably from 1.00% to 10% by weight. Similarly, the micro-size hollow particles are preferably from 0.01% to 30% by weight, more preferably from 0.10% to 15% by weight, and most preferably from 1.00% to 10% by weight.

As described above, in the thermal insulation pipe 10, by adding the hollow particles to the weakly bonded aerogel ultrafine particle which is filled as a thermal-insulating material in the annular space between the inner pipe 2 and the outer pipe 1, thermal conductivity of the thermal-insulating material can be lowered.

Third Embodiment

The thermal insulation pipe 10 of the present invention may include a support mechanism 4 for supporting the inner pipe 2 fixed to the outer pipe 1 (see FIGS. 1 and 2). The support mechanism 4 is formed by folding a member that is longer than the linear distance between the outer pipe 1 and the inner pipe 2. The thermal insulation pipe 10 is structured to minimize thermal conduction between the outer pipe 1 and the inner pipe 2 while keeping the mechanical strength between the outer pipe 1 and the inner pipe 2. Although not illustrated, at both terminal ends of the thermal insulation pipe 10, i.e., at connecting portions with other apparatuses like another thermal insulation pipe 10 and a tank, a mechanism for connecting and supporting the outer pipe 1 and the inner pipe 2 may be provided. In this case, that mechanism may be desirably formed by folding a member that is longer than the linear distance between the outer pipe 1 and the inner pipe 2 in order to reduce thermal conduction at the connecting portions.

The terminal end of the thermal insulation pipe 10 may be desirably sealed to prevent leakage of the filled thermal-insulating material 3. The terminal end of the thermal insulation pipe 10 can be sealed after the annular space between the inner pipe 2 and the outer pipe 1 is filled with the thermal-insulating material 3. This eliminates the need for filling the thermal-insulating material 3 to the thermal insulation pipe 10 during construction. On the other hand, the thermal-insulating material 3 may be filled after construction. In this case, in order to fill the thermal-insulating material 3, the thermal insulation pipe 10 is provided with a pipe connected from the outside to the annular space between the inner pipe 2 and the outer pipe 1 (not shown). Further, it is also possible to further provide a pipe for exhausting the filled thermal-insulating material 3 from the thermal insulation pipe 10 to the outside (not shown). With this structure, exchange of the thermal-insulating material 3 is easy.

As described above, the weakly bonded aerogel ultrafine particle of the present invention is a fine particle powder of about 300 nm in size, which is about one thousandth of that of the related art aerogel powder by ultra-high speed crushing. Therefore, even if there is a narrowing portion in the annular space, it can be filled thoroughly.

In the thermal insulation pipe 10 of the present invention, it is possible to enclose a gas having a lower thermal conductivity than air in the annular space between the inner pipe 2 and the outer pipe 1 besides as well as filling the space with the thermal-insulating material 3. This can further improve thermal insulation performance. The gas to be enclosed is desirably carbon dioxide, for example. To enclose carbon dioxide, frozen carbon dioxide may be introduced together when the annular space between the inner pipe 2 and the outer pipe 1 is filled with the thermal-insulating material 3. The frozen carbon dioxide vaporizes and fills the annular space with carbon dioxide.

Pressure in the annular space of the thermal insulation pipe 10 of the present invention may be reduced while the annular space is being filled with the thermal-insulating material 3. For the reduction of pressure in the annular space, the thermal insulation pipe 10 may be desirably connect to a pipe and a vacuum pump for exhausting the annular space (not shown).

Figure 14:
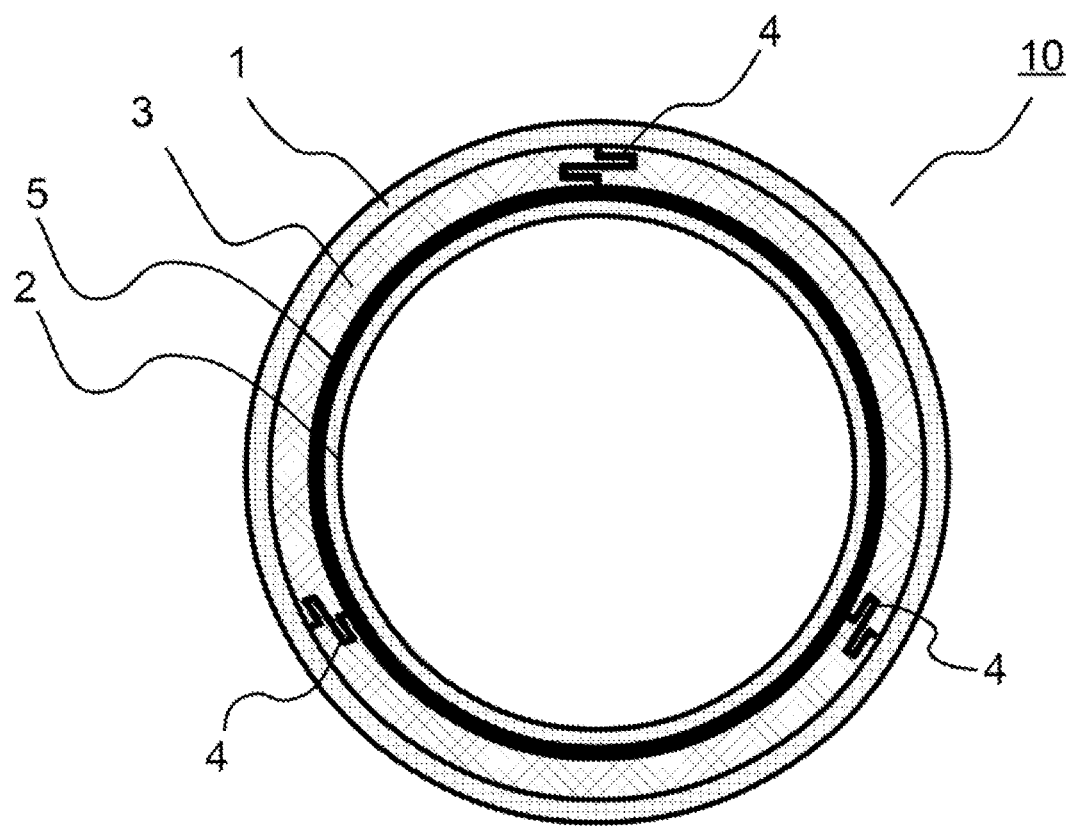
FIG. 14 is an explanatory diagram illustrating a cross-sectional structure of a thermal insulation pipe with a wrapped inner pipe.

In the thermal insulation pipe 10 of the present invention, it is more desirable that the periphery of the inner pipe 2 is wrapped with a wrapping member 5 containing fibers. FIG. 14 is an explanatory diagram illustrating a cross-sectional structure of the thermal insulation pipe 10 in which the inner pipe 2 is wrapped. Accidents such as a rupture of the inner pipe 2 can be prevented when the fluid flowing into the inner pipe 2 is a high-pressure gas or liquid hydrogen, which poses a danger of high pressure. Desirable examples of the materials constituting the wrapping member 5 may include glass fiber and carbon fiber.

The structure of the thermal insulation pipe 10 suitable for the present invention is shown in Table 1 below. The thermal insulation pipe of the present invention may be established by a structure in which the inner pipe 2 and the outer pipe 1 are made of metal, a member made of plastic or polymer, or a combination thereof, such as a layered structure of these members. Especially when the inner pipe 2 is used for delivering liquefied hydrogen, it is necessary to select an appropriate material, such as SUS304L, SUS316, SUS316L in consideration of resistance to hydrogen embrittlement. Further, it is desirable that the following specifications are satisfied.

TABLE 1

|  | OPTIMUM RANGE | | AVERAGE RANGE | | WIDE RANGE | |
| --- | --- | --- | --- | --- | --- | --- |
|  | MIN. | MAX. | MIN. | MAX. | MIN. | MAX. |
| INNER DIAMETER [mm] | — | 500 | — | 1000 | — | 3000 |
| WALL THICKNESS OF INNER PIPE [mm] | 5 | 20 | 3 | 40 | 2 | 60 |
| WALL THICKNESS OF OUTER PIPE [mm] | 5 | 50 | 3 | 100 | 2 | 150 |
| THICKNESS OF SPACE FILLED WITH THERMAL-INSULATING MATERIAL [mm] | 5 | 100 | 3 | 300 | 1 | 1000 |
| PRESSURE IN SPACE FILLED WITH THERMAL-INSULATING MATERIAL [torr] | $10^{-5}$ | 760 | $10^{-5}$ | 760 | $10^{-5}$ | 760 |

Specifications of the thermal-insulating material 3 suitable for the present invention are shown in Table 2 below.

TABLE 2

|  | OPTIMUM RANGE | | AVERAGE RANGE | | WIDE RANGE | |
| --- | --- | --- | --- | --- | --- | --- |
|  | MIN. | MAX. | MIN. | MAX. | MIN. | MAX |
| Particle diameter [μm] | 0.1 | 1 | 0.1 | 50 | 0.1 | 400 |
| Bulk density [g/cm$^3$] | 0.015 | 0.03 | 0.01 | 0.08 | 0.003 | 0.15 |

While the invention made by the present inventors has been particularly described with respect to the embodiments thereof, the invention is not limited thereto and other changes may be made therein without departing from the spirit and scope of the invention.

INDUSTRIAL APPLICABILITY

The present invention can be suitably used for thermal insulation from the environment when the temperature of the fluid flowing through the thermal insulation pipe is low or high.

EXPLANATION OF SIGN

1 Outer pipe
2 Inner pipe

3 Thermal-insulating material
4 Support member
5 Wrapping member
10 Thermal insulation pipe
11 Primary particles
20 Secondary particles
21 Secondary particle in which primary particles are less densely aggregated
30 Three-dimensional network structure formed by framework with secondary particle as unit
31 Three-dimensional network structure formed by framework of secondary particles in which primary particles are less densely aggregate as unit (low-binding ultrafine particle aerogel)
40 Cut surface by crusher
50 General aerogel powder
51 Weakly bonded aerogel ultrafine particle of the present invention

The invention claimed is:

1. A thermal insulation pipe comprising:
an inner pipe, an outer pipe, a space between the inner pipe and the outer pipe, and a thermal-insulating material filled in the space,
wherein the thermal-insulating material is a weakly bonded ultrafine aerogel powder that is made from crushed aerogel having a three-dimensional network structure with a framework constituted by a cluster that is an aggregation of primary particles such that the weakly bonded ultrafine aerogel powder comprises fine particles having a three-dimensional network structure with a framework of the primary particles, and wherein 50% or more of a total number of the fine particles are dispersed with a mode value of the particle size of 0.1 μm or more and 1.0 μm or less.

2. The thermal insulation pipe according to claim 1, wherein the thermal-insulating material further comprises hollow particles.

3. The thermal insulation pipe according to claim 2, wherein each hollow particle has a shell, and gas having thermal conductivity lower than that of air is enclosed in a hollow portion inside the shell.

4. The thermal insulation pipe according to claim 1, wherein gas having a lower thermal conductivity than that of air is enclosed in the space between the inner pipe and the outer pipe.

5. The thermal insulation pipe according to claim 1, wherein a pressure in the space between the inner pipe and the outer pipe is lower than an atmospheric pressure.

6. The thermal insulation pipe according to claim 1, wherein
the thermal insulation pipe comprises a support mechanism fixed to the outer pipe for supporting the inner pipe; and
the support mechanism is formed by folding a member that is longer than the linear distance between the inner pipe and the outer pipe.

7. The thermal insulation pipe according to claim 1, wherein the inner pipe is further wrapped with a member containing fiber.

* * * * *